(12) United States Patent
Takeda

(10) Patent No.: US 6,961,297 B2
(45) Date of Patent: Nov. 1, 2005

(54) OPTICAL HEAD DEVICE

(75) Inventor: Tadashi Takeda, Shimosuwa-machi (JP)

(73) Assignee: Sankyo Seiki Mfg. Co., Ltd., Nagano (JP)

( * ) Notice: Subject to any disclaimer, the term of this patent is extended or adjusted under 35 U.S.C. 154(b) by 590 days.

(21) Appl. No.: 09/900,308

(22) Filed: Jul. 6, 2001

(65) Prior Publication Data

US 2002/0051421 A1  May 2, 2002

(30) Foreign Application Priority Data

Jul. 7, 2000 (JP) .............................. 2000-206922

(51) Int. Cl.[7] .............................................. G11B 7/00
(52) U.S. Cl. .............................. 369/112.14; 369/112.21
(58) Field of Search .................... 369/44.11, 44.14, 369/44.37, 47.28, 112.01, 112.03, 112.04, 369/112.09, 112.15, 112.16, 112.17, 112.19, 369/112.21

(56) References Cited

U.S. PATENT DOCUMENTS

| | | | | |
|---|---|---|---|---|
| 5,177,349 A | * | 1/1993 | Setani | ..................... 250/208.1 |
| 5,666,344 A | * | 9/1997 | Imaino et al. | ................. 369/94 |
| 6,084,843 A | * | 7/2000 | Abe et al. | ............... 369/112.07 |
| 6,115,345 A | * | 9/2000 | Kato et al. | ................ 369/44.23 |
| 6,201,780 B1 | * | 3/2001 | Katayama | ............... 369/112.19 |
| 6,320,699 B1 | * | 11/2001 | Maeda et al. | ............ 369/44.23 |
| 6,449,237 B1 | * | 9/2002 | Yoo et al. | .............. 369/112.05 |

FOREIGN PATENT DOCUMENTS

JP  80-55363  2/1996

\* cited by examiner

*Primary Examiner*—William Korzuch
*Assistant Examiner*—Bach Vuong
(74) *Attorney, Agent, or Firm*—Reed Smith LLP

(57) ABSTRACT

The present invention provides for a optical head device having a beam-guiding optical device to bring beams of different wavelengths which are emitted by separate light sources together onto the same optical axis or to guide the beams onto a common photo receiving device. The beam-guiding optical device includes an incident plane and an exit plane and the incident plane and the exit plane are back to back. One of the incident plane and the exit plane has a stair-like surface wherein a step height between neighboring treads in the stair-like surface is set to cause a phase difference of n wavelength to one of the beams passing through the neighboring treads and n is equal to 1, 2, 3 . . . .

5 Claims, 7 Drawing Sheets

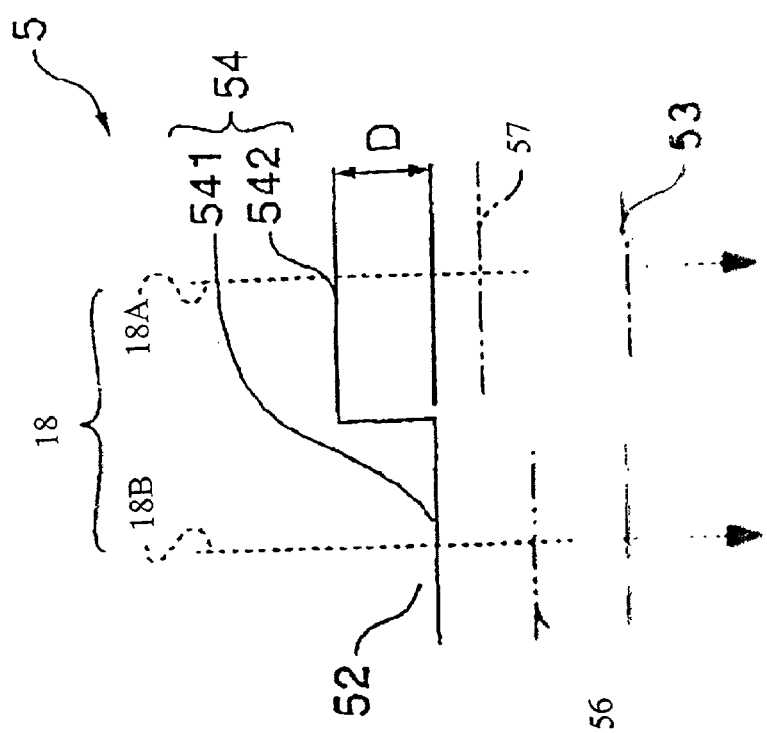
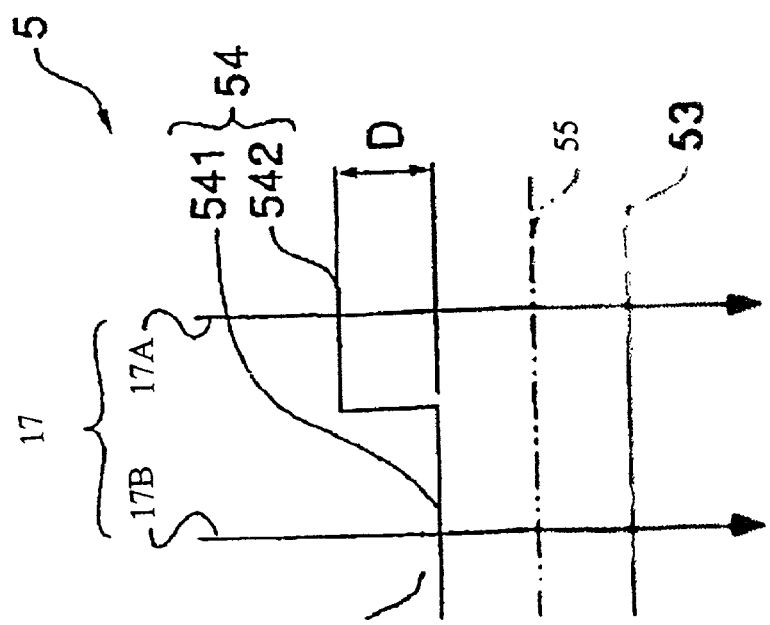
Fig. 3(a)
Fig. 3(b)

OPTICAL HEAD DEVICE

RELATED APPLICATIONS

This application claims Paris Convention priority of Japanese Patent Application Number 2000-206922 filed on Jul. 7, 2000, the complete disclosure of which is incorporated by reference.

BACKGROUND OF THE INVENTION

1. Field of the Invention

The present invention relates to a double-wavelength optical head device which is used for the recording/reproducing of optical recording media such as CDs (compact disks) and DVDs (digital versatile disks). More specifically, the present invention relates to, in such a double-wavelength optical head device, a beam-guiding optical device for changing the relative angle between the beams of different wavelengths emitted by different light sources having different emitting points, to bring the beams together onto the same optical axis or to guide the beams onto a common photo receiving device.

2. Related Art

CDs and DVDs are known as optical recording media and differ in substrate thickness and recording density. Such optical recording media require laser beams of different wavelengths to record and reproduce data thereon/therefrom. For example, DVDs need a laser beam having a wavelength of 650 nm for reproduction due to the low index of reflection within the 650 nm wavelength band whereas CD-Rs need a laser beam having a wavelength of 780 nm for recording and reproduction.

Further, an optical head device for reproducing DVDs and reading and/or writing CD-Rs is called a double-wavelength optical head device. A double-wavelength optical head device has both a laser light source for emitting a laser beam having a wavelength of 650 nm and another laser light source for emitting a laser beam having a wavelength of 780 nm. An example of such a double-wavelength optical head device is disclosed in Japanese Patent Application No. H8-55363.

In such a double-wavelength optical head device, the optical system is shared between the laser beams so that the device is compact. Therefore, the laser beams emitted from the different emitting points of the different laser light sources need to be guided to the same optical path through a beam splitter and converged onto an optical recording medium through a common objective lens. Also, the reflection from the optical recording medium is detected by a common photo receiving device.

However, the beam splitter used for guiding multiple laser beams to a common optical path reflects one of the laser beams and transmits the other laser beam to bring the beams together onto the same optical path. To converge the laser beams as a diffraction-limited spot through an objective lens for data reading, the wave aberration of the laser beam passing through the beam splitter should not be deteriorated. As such, a cubic prism is generally used as the beam splitter. The beam splitter is thus expensive and is an obstacle to reducing manufacturing costs.

Furthermore, when a common photo receiving device is used, the position of each of the two individually arranged laser light sources needs to be adjusted 3-dimensionally with respect to the common photo receiving device, and the beams emitted by the different laser light sources are reflected at the optical recording medium and then focused onto a spot. Thus, the cost of the positional adjustment is an additional problem. Also, reliability may be degraded.

In view of these problems, it is a purpose of the present invention to provide in an optical head device that has multiple light sources for emitting beams of different wavelengths, a beam-guiding optical device for bringing the beams emitted by the different light sources together onto the same optical axis and to do so while reducing manufacturing costs.

It is another purpose of the present invention to provide in an optical head device that has multiple light sources for emitting beams of different wavelengths, a beam-guiding optical device for guiding the beams reflected from the optical recording medium onto a common photo device which can be manufactured inexpensively.

Another purpose of the present invention is to provide an optical head device in which an optical system can be configured inexpensively and the adjustments thereof at installation can be easily performed by using a beam-guiding optical device that is inexpensively manufactured.

SUMMARY OF THE INVENTION

It has now been discovered that these purposes can be achieved by the present invention. In particular, the present invention provides for a beam-guiding optical device in an optical head device to bring beams of different wavelengths which are emitted by separate light sources together onto the same optical axis or to guide the beams onto a common photo receiving device. The beam-guiding optical device includes an incident plane and an exit plane back to back, one of which has a stair-like surface, wherein a step height between the neighboring treads in the stair-like surface is set to cause a phase difference of n wavelength (n=1, 2, 3 . . . ) to one of the beams. The beams which are of different wavelengths pass through the neighboring treads.

In one of the beams that has passed through the beam-guiding optical device of the present invention, the phase difference between the optical components that have passed the threads is some integer multiple of the wavelength and thus the wavefront is not displaced. As such, this beam does not change the traveling direction and emerges from the exit plane producing the same wavefront as that created when entering the incident plane. In the other beam which has a different wavelength, the phase difference between the optical components of the beam that have passed the treads is not some integer multiple of the wavelength and accordingly the wavefront is displaced. Consequently, this beam is deflected from the traveling direction by a predetermined angle and emerges as such from the exit plane. For this reason, as the beams pass through the beam-guiding optical device of the present invention, the relative angle between the beams in the traveling direction is changed to bring the beams together onto the same optical axis or to guide the beams onto a common photo receiving device.

When either of the beams is a dispersing beam or a converging beam, it is preferable that the treads of the beam-guiding optical device of the present invention be curved.

In addition, when the treads are formed concentrically, errors in positioning of the beam-guiding optical device in the rotating direction about the optical axis can be reduced compared to that with the treads in parallel.

The present invention also provides for an optical head device having the above mentioned beam-guiding optical device, including:

a first light source for emitting a first beam of light;
a second light source for emitting a second beam of light which differs in wavelength from the first beam of light;
an objective lens for converging the first and second beams of light onto a recording surface of an optical recording medium; and
a common photo receiving device for receiving the first and second beams of light that are reflected from the recording surface of the optical recording medium through the objective lens. In this optical head device, the beam-guiding optical device is placed on an optical path between the objective lens and the common photo receiving device to deflect one of the first and second beams of light that have been reflected from the recording surface of the optical recording medium and to guide both of the first and second beams of light onto the common photo receiving device.

The beam-guiding optical device can also be placed on the optical path between the first and second light sources and the objective lens to bring the first and second beams of light together onto the same optical axis and to guide them to the objective lens.

Furthermore, it is preferable to store the first and second light sources in a single package as a light source unit instead of preparing them as separate light sources. This simplifies the optical positional adjustments among the light sources and the common photo receiving device.

BRIEF DESCRIPTION OF THE DRAWINGS

FIG. 2 (b) is a side view thereof, and FIG. 2 (c) is a partially magnified cross-sectional view of the incident plane.

FIGS. 3 (a) and (b) illustrate the deflection of the laser beam that passes through the beam-guiding optical device in FIG. 1.

DETAILED DESCRIPTION OF THE INVENTION

Embodiments of a double-wavelength optical head device equipped with a beam-guiding optical device of the present invention are described hereinafter based on the drawings.

Figure 1:
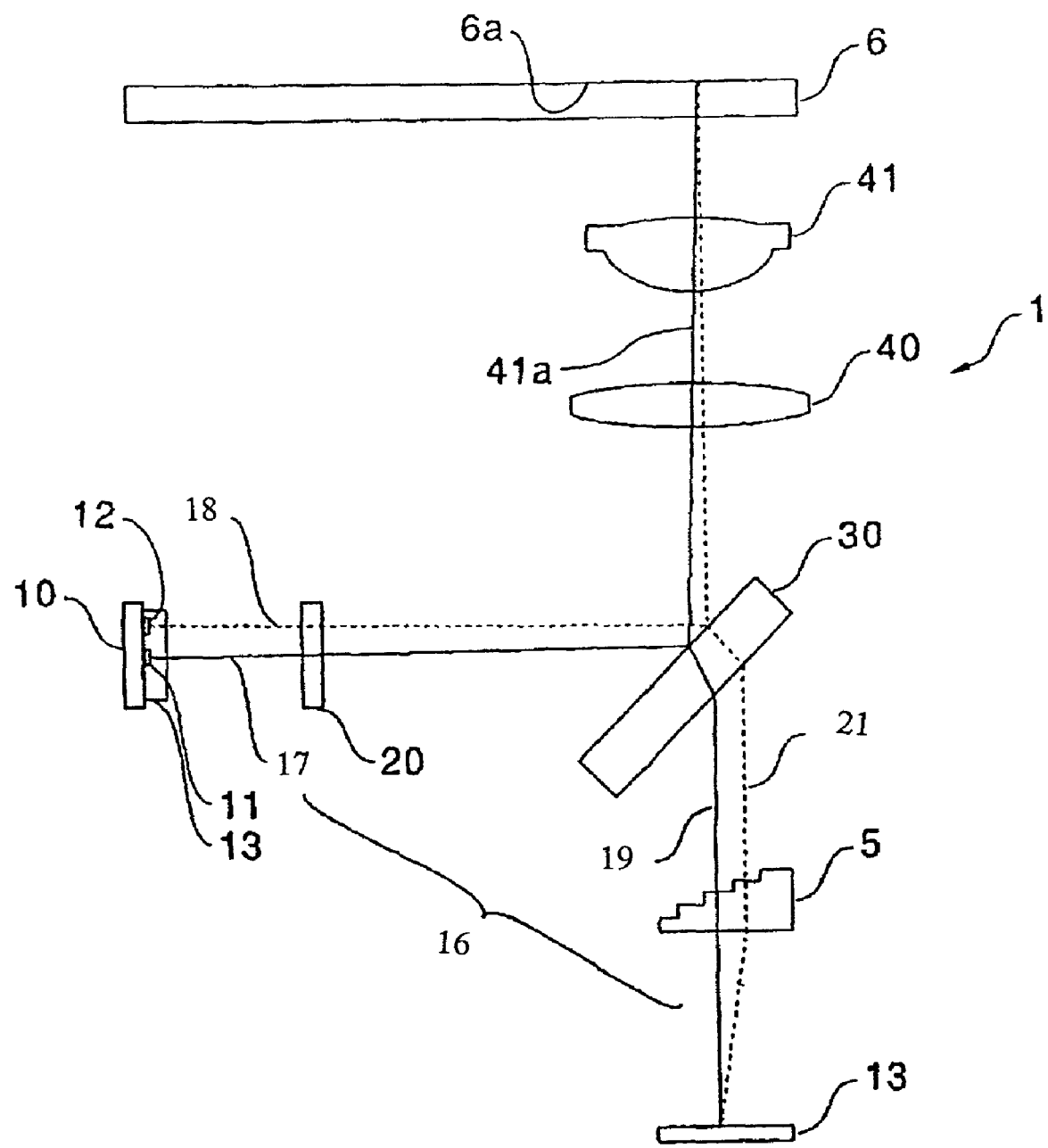
FIG. 1 is a schematic diagram of an optical system of an optical head device including a beam-guiding optical device of the present invention.

FIG. 1 is a schematic diagram of an optical system of a double-wavelength optical head device. The optical head device 1 reproduces and records information with respect to an optical recording medium 6 such as a CD, CD-R, DVD, etc., which varies according to the substrate thickness and the recording density. The optical head device 1 includes a double-wavelength light source (light source unit) 10 which contains a first laser light source 11 for emitting a first laser beam 17 of wavelength 650 nm, shown by a solid line, a second laser light source 12 for emitting a second laser beam 18 of wavelength 780 nm, shown by a single-dotted line, and a common optical system 16. The first laser beam 17 and the second laser beam 18 are at a distance of about 110 $\mu$m from each other at the beam emitting points.

Arranged in the common optical system 16 are a diffraction grating 20, a flat plate-like beam splitter 30, a collimating lens 40 and an objective lens 30. The diffraction grating 20 splits the first laser beam 17 and the second laser beam 18 emitted by the double-wavelength light source 10 into three beams to generate tracking error signals. The beam splitter 30 partially reflects the laser beams 17 and 18, which are now divided into three beams. The collimating lens 40 collimates the laser beams 17 and 18 reflected from the beam splitter 30. The objective lens 41 converges the laser beams 17 and 18 emerging from the collimating lens 40 onto a recording surface 6a of the optical recording medium 6.

Also arranged in the common optical system 16 is a common photo receiving device 3 for receiving the returning beams 19 and 21 of the laser beams 17 and 18 that have passed through the beam splitter 30. A beam-guiding optical device 5 is placed between the beam splitter 30 and the photo receiving device 13 for guiding the returning beams 19 and 21, which have different optical axes, onto the common photo receiving plane of the common photo receiving device 3. The configuration of the beam-guiding optical device 5 will be described later.

In this embodiment, the optical axis of the first laser beam 17 emitted by the first laser light source 11 is made to coincide with the system optical axis 41a of the optical head device 1 which is the optical axis of the objective lens 41. Accordingly, the second laser beam 18 emitted by the second laser light source 12 passes through the common optical system 16 while the optical axis thereof is shifted from that of the first laser beam 17.

When reproducing information from a DVD as the optical recording medium 6 in the optical head device 1 configured as discussed above, a first laser beam 17 of wavelength 650 nm is emitted by the first laser light source 11. The first laser beam 17 is guided to the common optical system 16 and converged by the objective lens 41 as an optical spot on the recording surface of the DVD. The returning beam 19 of the first laser beam 17 which is reflected from the recording surface of the DVD is focused onto the common photo receiving device 3 through the beam splitter 30 and the beam-guiding optical device 5. Data reproduction from the DVD is performed based on the signals detected by the common photo receiving device 3.

When reproducing information recorded on a CD-R as the optical recording medium 6, a second laser beam 18 of wavelength 780 nm is emitted by the second laser light source 12. The second laser beam 18 is also guided to the common optical system 16 and converged by the objective lens 41 as an optical spot on the recording surface of the CD-R. The returning beam 21 of the second laser beam 18 which is reflected from the recording surface of the CD-R is focused onto the common photo receiving device 3 through the beam splitter 30 and the beam-guiding optical device 5. Data reproduction from the CD-R is performed based on the signals detected by the common photo receiving device 3.

Since the optical axes of the first and second laser light sources 11 and 12 are shifted from one another, the focusing spot of the returning beam 21 on the common photo receiving device 3 is also shifted from that of the returning beam 19. The displacement of the focusing spot is corrected by the beam-guiding optical device 5.

As stated above, FIGS. 2 (a) and (b) are plan and side views of the incident plane of the beam-guiding optical device of FIG. 1 and FIG. 2 (c) is a partially magnified cross-sectional view of the incident plane.

Figure 2A:
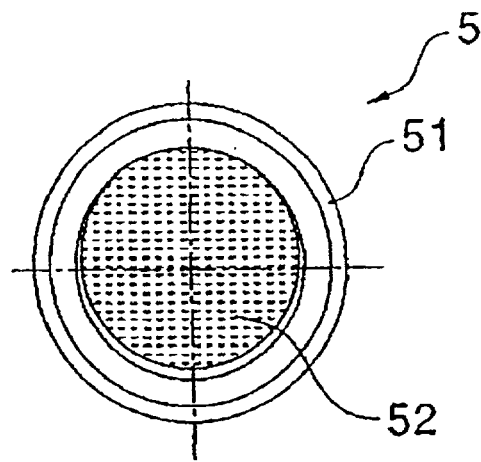
FIG. 2 (a) is a plan view of an incident plane of the beam-guiding optical device of FIG. 1.
Figure 2B:
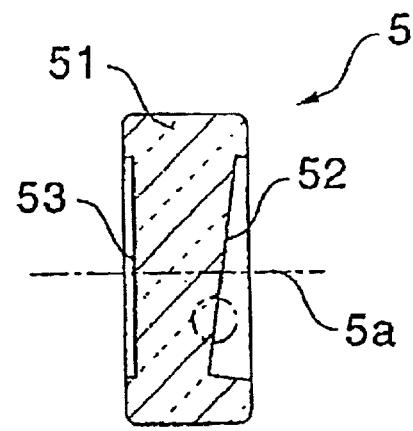

In particular, in FIGS. 2(a) and (b), the beam-guiding optical device 5 is a resin-cured product having a disk-like shape as a whole. A plane framed with a circular outer peripheral portion 51 is an incident plane 52; the other side is an exit plane 53 as shown in FIG. 2(b). As illustrated in FIG. 2 (c), the incident plane 52 has a stair-like surface in which the steps are created in the optical axis 5a direction. The stair-like surface is formed such that multiple treads 54 are in parallel by a predetermined width. The exit plane 53 has a flat surface perpendicular to the optical axis 5a of the optical device 5.

The material of the beam-guiding optical device 5 allows the first and second laser beams, 17 and 18 respectively, to pass through the device 5. The beam-guiding optical device 5 is composed of resin material with n1=1.51862 and n2=1.52196 where n1 is the refractive index of the resin material to the first laser beam of wavelength 650 nm and n2 is the refractive index of the resin material to the second laser beam of wavelength 780 nm.

FIGS. 3(a) and (b) illustrate the step height in the incident plane 52. The step height, D, between the neighboring lower tread 541 and upper tread 542 is set such that the optical path of the first laser beam 17 of wavelength 650 nm passing through the upper tread 542 is shifted from that passing through the lower tread 541 by a wavelength ($2\pi$). In other words, the optical path length (OP1) of the laser beam portion 17A of the first laser beam 17 ("OP1(A)"), which passes through the upper tread, obtained when the portion 17A passes through the height of the step, given by D, is expressed by the following equation:

$$OP1(A)=k1*n1*D$$

where $\lambda 1$ is the wavelength 650 nm and $k1=2\pi/\lambda 1$. The optical path length of the laser beam portion 17B of the first laser beam 17 ("OP1(B)"), which passes through the lower tread 541 next to the upper tread 542, from the space equal to the step height D to the lower tread 541 is expressed by OP1(B)=k1*1*D. Since the step height D is set to cause the optical path difference between OP1(A) and OP1(B) by a wavelength (2), OP1(A)−OP1(B)=k1*(n1−1)*D=2. The step height D is then calculated as:

$$D=\lambda 1/(n1-1)=1253.3 \text{ nm}$$

With the step height D set to be 1253.3 nm, as the first laser beam 17 passes through the incident plane 52, the phase of the wave thereof is shifted, but the wavefront thereof is not displaced. Therefore, each of the step-transmitted wavefronts intensifies the other wavefronts to generate the original wavefront (the step-transmitted wavefront 55 schematically shown by a double-dotted line). For this reason, the beam does not change the traveling direction thereof even after emerging from the exit plane 53.

Next, the second laser beam 18 is described. The optical path length OP1(A) is given when the laser beam portion 18A passing through the upper tread 542 passes through the height of the step D. The optical path length OP1(B) of the beam portion 18B passing through the lower tread 541 adjacent to the upper tread 542 is measured as the beam portion 18B travels the space equal to the step height D until it reaches the lower tread 541. The optical path difference (OPD) between OP1(A) and OP1(B) of second laser beam 18 is calculated in the following manner wherein the wavelength 780 nm equals $\lambda 2$:

$$OPD=OP1(A)-OP1(B)=k2*(n2-1)*D$$

wherein $D=\lambda 1/(n1-1)$. As such, $OPD=2\pi*(\lambda 1/\lambda 2)*[(n2-1)/(n1-1)]$, however, $k2=2\pi/\lambda 2$ and $\lambda 1\lambda 2\neq(n2-1)/(n1-1)\neq 1$. Therefore, $OPD2\neq 2\pi$.

With the step height D set to be 1253.3nm and as the second laser beam 18 passes through the step height, the phase of the wave thereof is shifted and the wavefront is displaced. In FIG. 3 (b), while the wavefront 57 shown by the double-dotted line is the step-transmitted wavefront of the laser beam 18A after passing through the upper tread 542, the wavefront 56 shown by the double-dotted line is the step-transmitted wavefront of the laser beam 18B after passing through the lower tread 541. Thus, the wavefront 57 and the wavefront 56 are shifted from one another. Since the step-transmitted wavefronts 56 and 57 are generated in different manners from the original wavefront, the second laser beam 18 is deflected as it emerges from the exit plane 53. The amount of the shift between the wavefronts can be controlled by changing the step dimension.

Note that the step height D can be any dimension as long as the phase of the wave of the second laser beam 18 is shifted from the first laser beam 17 by some integer multiple of a wavelength ($2\pi$).

The beam-guiding optical device 5 of the optical head device 1 is simply shaped with steps on the surface thereof, and thus provides good productivity with inexpensive manufacturing costs. The laser beam is guided from each light source onto the common photo receiving device 3 (not shown) without using a prism. Thus, the optical system can be configured small resulting in low manufacturing costs. Further, since a double-wavelength light source unit is used in this embodiment, the optical positional adjustment between each light source and the common photo receiving device 3 is easily performed in comparison to that of separate light sources.

Figure 4A:
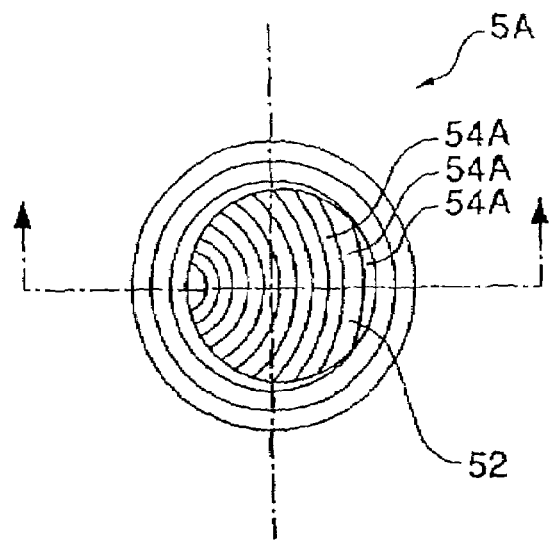
FIGS. 4 (a) and (b) are plan and cross-sectional views, respectively, of the incident plane of another embodiment of the beam-guiding optical device of FIG. 1.
Figure 4B:
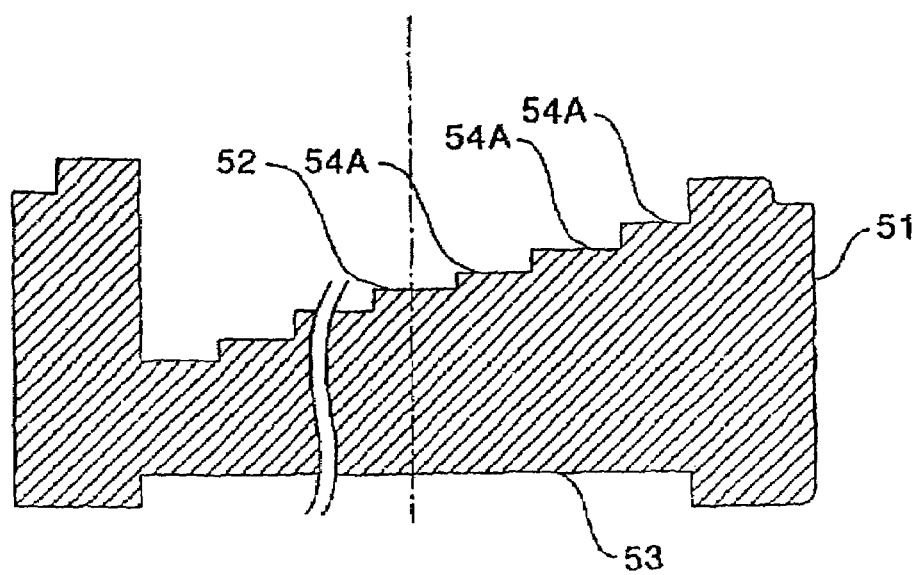

FIGS. 4 (a) and (b) are plan and cross-sectional views of the incident plane of another embodiment of the beam-guiding optical device of FIG. 1 as stated above. The basic configuration of the beam-guiding optical device 5A remains the same as the beam-guiding optical device 5 illustrated in FIGS. 2(a)–(c). However, the treads 54A of a predetermined width are concentrically created on the incident plane 52.

Figure 2C:
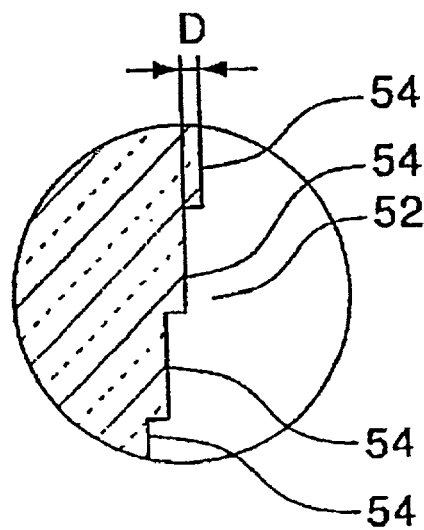

When the treads 54A are parallel as shown in FIG. 2(c) (the treads 54A are not designated in FIG. 2(c)), the second laser beam 18 (not shown) is deflected in the direction perpendicular to each tread. The deflected second laser beam 18 can be guided to the focusing spot of the first laser beam on the common photo receiving device 3 (not shown) only when the position of the beam-guiding optical device 5 in the rotational direction is precisely determined with respect to the system optical axis 41a. On the other hand, with the concentrically formed treads 54A as shown in FIG. 4(a), the second laser beam 18 that has passed through the treads 54A is deflected toward the center of the concentrically formed treads 54A by predetermined angles. Therefore, errors in the positioning of the beam-guiding optical device 5 in the rotating direction about the optical axis can be reduced in comparison to those in parallel.

Figure 5:
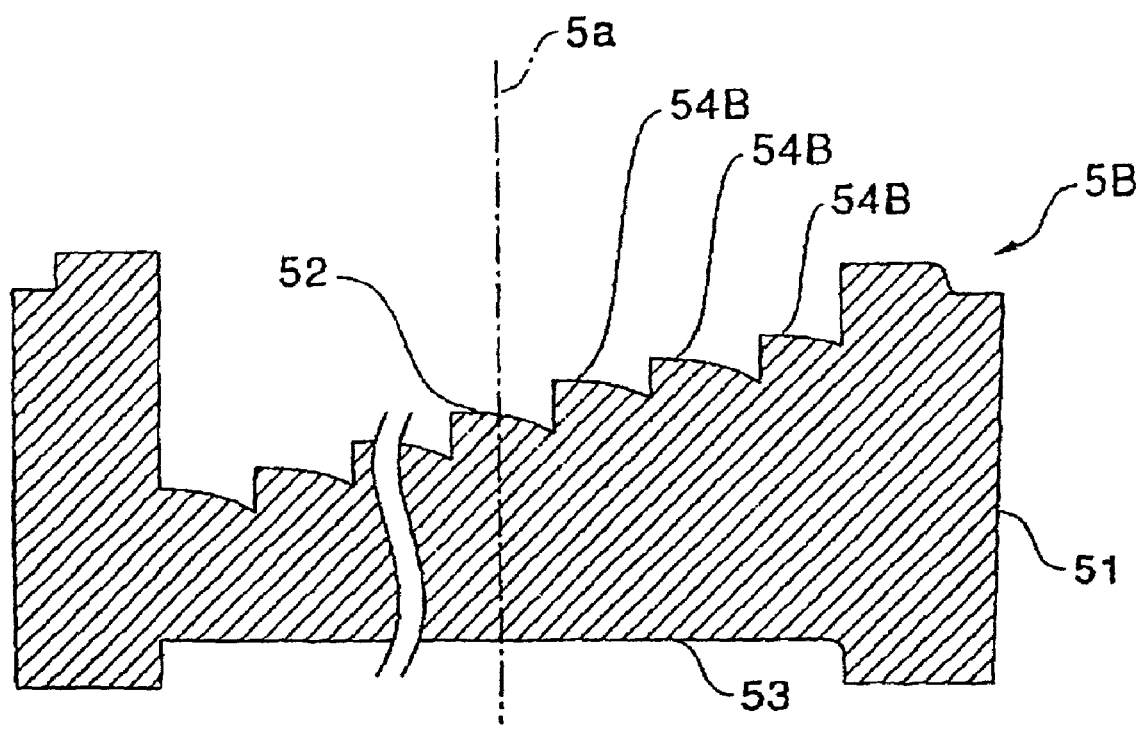
FIG. 5 is a cross-sectional view showing an example of the treads formed on the incident plane of the beam-guiding optical device of FIG. 1.

The above mentioned beam-guiding optical devices 5 and 5A are formed with a plane having the treads perpendicular to the optical axis 5a thereof; however, they may also be formed with convex or concave treads. FIG. 5 illustrates an example of a beam-guiding optical device 5 in which the treads are convex. No matter whether the first and second laser beams 17 and 18 are converging beams or diverging beams, the beam-guiding optical device 5B is capable of properly changing the relative angle between the first laser beam 17 and the second laser beam 18 to guide the beams 17 and 18 onto the common photo receiving device 3 (not shown).

Figure 6A:
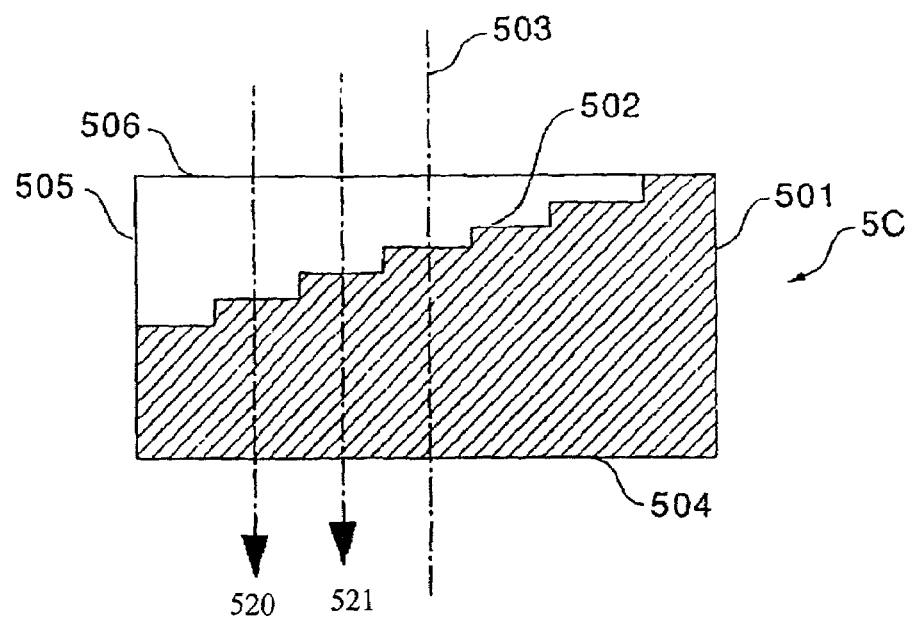
FIGS. 6 (a) and (b) illustrate two more examples of the beam-guiding optical device of FIG. 1.
Figure 6B:
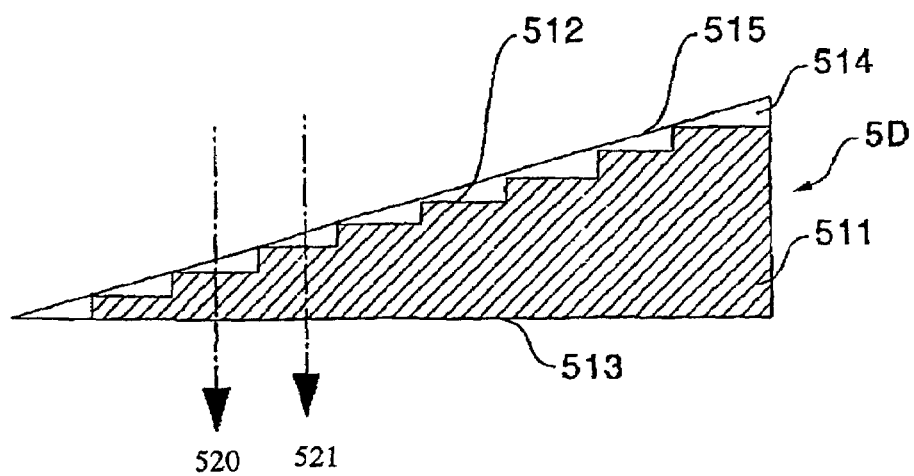

FIGS. 6(*a*) and (*b*) illustrate two more embodiments of a beam-guiding optical device. The beam-guiding optical device 5C in FIG. 6(*a*) is configured such that one of the planes of a plate-like main body 501 is made like an incident plane 502 having a stair-like cross-section. The other plane is a flat exit plane 504 perpendicular to the optical axis 503 thereof. Further, a polymer 505 having a refractive index which is different from that of the device main body 501, is polymerized with the incident plane 502. The incident plane 506 of the polymer 505 is finished flat so as to be perpendicular to the optical axis 503. Consequently, the beam-guiding optical device 5C of FIG. 6(*a*) has a rectangular cross-section as a whole.

The beam-guiding optical device 5D of FIG. 6(*b*) is configured such that an incident plane 512, which has a stair-like surface, is formed on the slope of a triangular prism 511. The flat plane facing the treads is an exit plane 513. A polymer 514 having a refractive index which is different from that of the prism 511, is polymerized on the incident plane 512 to form a smoothly sloped incident plane 515.

Even with the beam-guiding optical device 5C or 5D, the first and second laser beams 17 and 18 that enter the incident planes 506 or 515 and emerge from the flat exit planes 504 or 513 generate an optical path difference of some integer multiple of the wavelength between the beams 520 and 521 passing through the neighboring treads.

Figure 7:
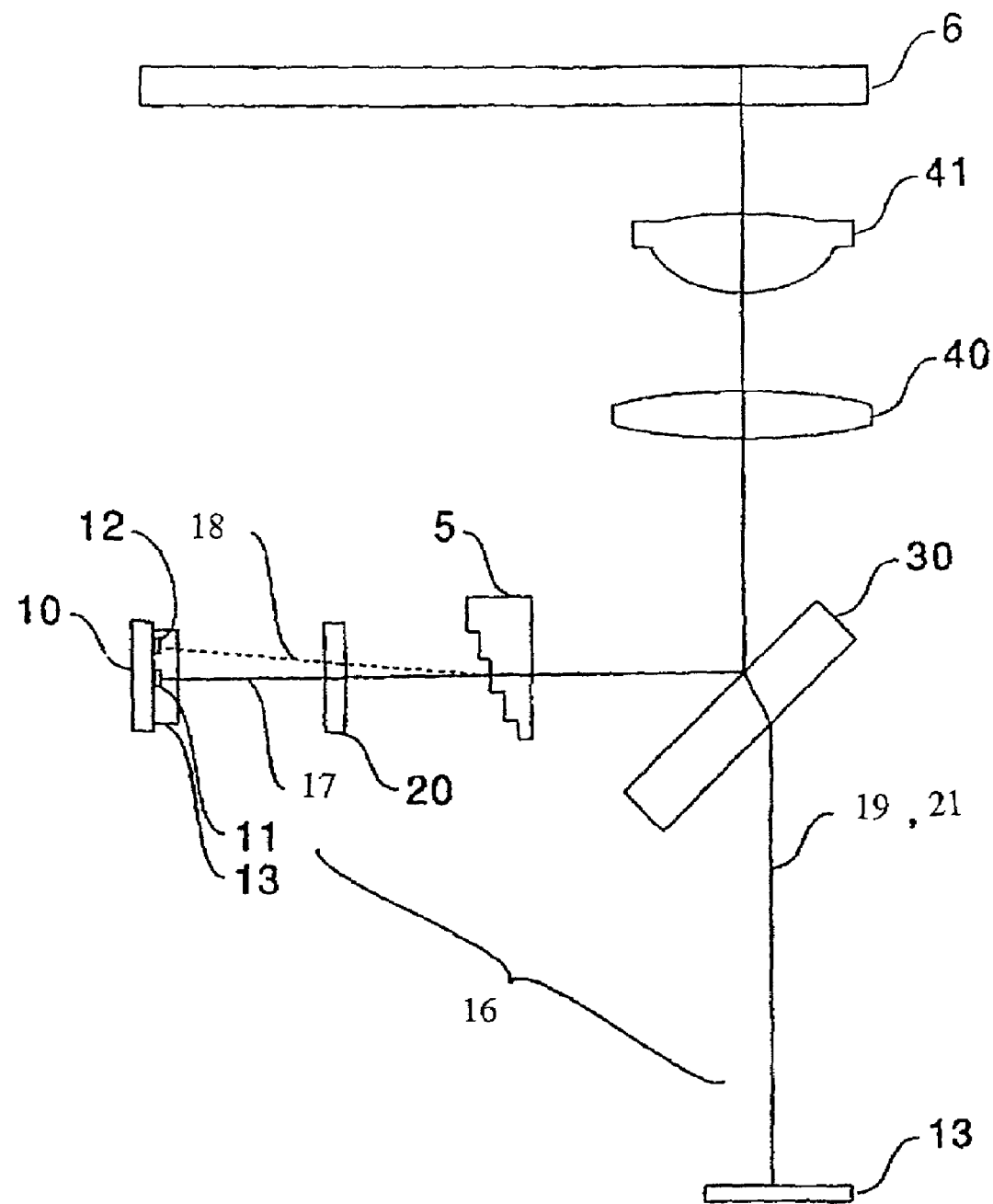
FIG. 7 is a schematic diagram of an optical system of an optical head device including another embodiment of a beam-guiding optical device of the present invention.

In the first embodiment discussed above, the beam-guiding optical device 5 is placed on the optical path between the objective lens 40 and the photo receiving device 13. However, as illustrated in FIG. 7, the beam-guiding optical device 5 may also be placed on the optical path between the first and the second laser light sources 11 and 12 and the beam splitter 30 which guides the first laser beam 17 and the second laser beam 18 to the objective lens 41.

As such, the beam-guiding optical device 5 changes the relative angle between the first laser beam 17 and the second laser beam 18 so that the first and second laser beams 17 and 18 emerge from the exit plane as the collimated beams for which the optical axes are the same and are guided to the common objective lens 41. Consequently, the returning beams 19 and 21 of the first and second laser beams 17 and 18 for which the optical axes are the same can be received on the common photo receiving device 3.

Although the second laser beam 18 is deflected by the beam-guiding optical device in the above examples, the first laser beam 17 can also be deflected rather than the second laser beam 18.

Also, the stair-like surface is formed on the incident plane of each of the above described beam-guiding optical devices, however, it can also be formed on the exit plane and the incident plane can be a flat surface.

Further, although the exit plane is a flat plane in the above beam-guiding optical devices, it can be made concave or convex to increase or decrease the diameter of the passing beam.

As described above, the beam-guiding optical device used in the double-wavelength optical head device of the present invention has a stair-like surface on the incident plane or the exit plane along the optical axis. By properly setting the step dimension between the neighboring treads, the relative angle between the two beams that are different in wavelength is changed as the beams pass through the beam-guiding optical device.

The beam-guiding optical device of the present invention has the stair-like surface on only one of the planes therefore facilitating the manufacturing and the mass production of the resin-cured product at a lower cost. Consequently, the optical system can be configured in a compact manner at a lower cost compared to other expensive optical devices such as a prism to bring the beams emitted by multiple light sources together onto the same optical axis or to guide the beams which are emitted by the multiple light sources and reflected from the recording medium onto the common photo receiving device.

When the treads that construct the stair-like surface are formed concentrically, the beam-guiding optical device does not strictly require an accurate positioning thereof in the rotational direction when installed in the optical head device optical system.

According to the beam-guiding optical device of the present invention, the optical axes of the beams emitted by the light source unit in which multiple light sources are stored can be brought on the same axis without using an expensive device such as a prism. This facilitates the configuration of an optical system of the optical head device using a light source unit. Therefore, the positional adjustments of the optical devices in the optical system and other components can be performed very easily compared to using separate light sources.

According to the beam-guiding optical device of the present invention, each of the beams emitted by the different light sources and reflected from the recording medium can be guided onto the common photo receiving device without using an expensive device such as a prism. As such, the optical system of the optical head device can be configured in a compact manner and at a lower cost.

In addition to the above effects, the optical system of the optical head device of the present invention can provide another advantage. When a transparent flat plate device is used in place of the beam-guiding optical device and a single light source is used instead of the double-wavelength light source unit, the optical system can be installed in a general optical head device of a single wavelength type. Consequently, the optical system frame to which the optical system is attached can be commonly used in both a double-wavelength optical head and a single wavelength optical head.

Thus, while there have been described what are presently believed to be the preferred embodiments of the present invention, those skilled in the art will realize that other and further embodiments can be made without departing from the spirit and scope of the invention, and it is intended to include all such further modifications and changes as come within the true scope of the invention.

What is claimed is:

1. An optical head device having a beam-guiding optical device to bring beams of different wavelengths which are emitted by separate light sources together onto the same optical axis or to guide said beams onto a common photo receiving device, comprising: an incident plane; and an exit plane, said incident plane and exit plane being back to back wherein one of the incident plane and the exit plane has a stair-like surface; wherein a step height between neighboring treads in said stair-like surface is set to cause a phase difference corresponding to "n" wavelengths to one of said beams when the one of the beams passes through said neighboring treads so as not to change the traveling direction, the optical head device comprising:

a first light source for emitting a first beam of light;

a second light source for emitting a second beam of light which differs in wavelength from said first beam of light;

a beam splitting element for separating a forward optical path directed to the optical recording medium from the first light source and second light source from a return optical path directed to the common photo receiving device from the optical recording medium;

an objective lens for converging said first and second beams of light onto a recording surface of an optical recording medium; and a common photo receiving device for receiving said first and second beams of light which are reflected from said recording surface of said optical recording medium through said objective lens;

wherein said beam-guiding optical device is placed on the return optical path separated from the forward optical path between said objective lens and said common photo receiving device to deflect one of said first and second beams of light that have been reflected from said recording surface of said optical recording medium and to guide both of said first and second beams of light onto said common photo receiving device.

2. The beam-guiding optical device of claim 1 wherein said treads are curved.

3. The beam-guiding optical device of claim 1 wherein said treads are formed concentrically.

4. The optical head device of claim 1 wherein said first and second light sources are stored in a single package as a light source unit.

5. The optical head device of claim 1 wherein the beam-guiding optical device is placed on the return optical path between the beam splitting element and the common photo receiving device.

* * * * *